United States Patent [19]
Lin

[11] Patent Number: 5,454,580
[45] Date of Patent: Oct. 3, 1995

[54] FOOTREST FOR MOTORCYCLE

[76] Inventor: Frank Lin, No. 377, Sec1, Changmei Road, Changhua, Taiwan

[21] Appl. No.: 255,179

[22] Filed: Jun. 7, 1994

[51] Int. Cl.$^6$ .................. B62J 6/00; B62J 25/00
[52] U.S. Cl. .................. 280/291; 74/164; 362/72
[58] Field of Search .................. 280/291, 163; 74/564; 362/61, 72

[56] References Cited

U.S. PATENT DOCUMENTS

| | | | |
|---|---|---|---|
| 2,151,144 | 3/1939 | Penny et al. | 362/72 |
| 3,950,727 | 4/1976 | Smith | 362/72 |
| 4,797,791 | 1/1989 | Burchick | 280/291 |

*Primary Examiner*—Mitchell J. Hill
*Attorney, Agent, or Firm*—Merchant, Gould, Smith, Edell, Welter & Schmidt

[57] ABSTRACT

A footrest including a supporting bracket pivotally mounted to a motorcycle by a supporting bracket assembly. An elongate slot is formed in an upper surface of the supporting bracket, and a receiving chamber is formed in an underside of the bracket, the slot and chamber being in communication through a plurality of holes formed therebetween in the bracket. A resilient pad is disposed in the elongate slot, and a reflective rod is disposed within the chamber. A plurality of dowel posts project from the underside of the resilient pad and extend through the holes between the slot and the chamber to engage the reflective rod such that the pad and the reflective rod are retained in the supporting bracket.

1 Claim, 5 Drawing Sheets 5,454,580

FOOTREST FOR MOTORCYCLE

BACKGROUND OF THE INVENTION

This invention relates to an improved footrest for motorcycle. This footrest includes a supporting bracket attached to the frame of the motorcycle. The supporting bracket includes an elongate slot at the upper surface of the bracket. A receiving chamber is provided in the underside of the bracket which is in communication with the slot through a plurality of holes in the supporting bracket. The supporting bracket is further provided with an enlarged end portion defining a protective end thereof. An elongate reflective rod is received within the chamber in such a manner that a soft pod which is disposed within said elongate slot is engaged with the reflective rod through means of a plurality of dowel posts which project from the soft pad to the reflective rod through the holes in the supporting bracket. By this arrangement, a footrest which can fully support the foot is made. When the footrest is retracted, an excellent reflective effect is also provided.

Motorcycles are the main mode of transportation for many white collar workers and salesmen due to its convenience and mobility. It has become a main mode of transportation for modern society. The motorcycle has also been provided with a footrest for a passenger. As shown in FIG. 1, the conventional footrest A1 has a simple configuration. Referring to FIG. 1A, it discloses a detailed view of the conventional footrest A1 circled in FIG. 1. The footrest A1 includes a shaft rod A2 which has a traverse hole which can be pivotally installed onto the bracket provided by the frame of the motorcycle. The shaft rod A2 is enveloped with a plastic sleeve A3. This has a relatively simple configuration, easy to manufacture, and the manufacturing cost is low. But, the plastic sleeve A3 has a poor fictional force. Accordingly, when the motorcycle rides in a comparatively high speed, and encounters a rugged road, the passenger's foot can not easily rest on the footrest and tends to slip over and bounce thereof easily. If the foot loses its support, not only will it bring a negative influence to the steerability of the motorcycle, but will also generate a dangerous situation if the unsupported foot bumps into an obstacle.

The plastic sleeve A3 is a simple layer of plastic sheet which can not absorb any vibration during the riding. Accordingly, it is very uncomfortable when vibration is directly transferred to the arch portion of the passenger's foot.

When the motorcycle is stopped, it is hard to be seen from the side since there are no reflective plates provided in the side of the motorcycle. Accordingly, the side collisions can not be positively avoided.

SUMMARY OF THE INVENTION

It is the object of this invention to provide an improved footrest which provides a durable support to the foot of the passenger and the bottom of the footrest serves as a reflective plate when the footrest is erected.

In order to achieve the object set forth, the footrest includes a supporting bracket attached to the frame of the motorcycle. The supporting bracket includes an elongate slot at the upper surface of the bracket. A receiving chamber is provided in the underside of the bracket which is in communication with the slot through a plurality of holes in the supporting bracket. An elongate reflective rod is received within the chamber in such a manner that a soft pod which is disposed within said elongate slot is engaged with the reflective rod through a plurality of dowel posts which project from the soft pad to the reflective rod through the holes in the supporting bracket. By this arrangement, a footrest which can fully support the foot is made. When the footrest is retracted, an excellent reflective effect is also provided.

In a preferable embodiment of the footrest, the supporting bracket is further provided with an enlarged end portion defining a protective end thereof. Accordingly, the side movement of the foot resulting from the vibration of the motorcycle is positively avoided.

In a preferable embodiment of the footrest, the soft pad provides a vibration absorbing effect resulting from its thickness. Accordingly, the foot can be comfortably seated thereof.

In a preferable embodiment of the footrest, the reflective rod is received and retained in the receiving chamber of the supporting bracket in such a manner that the reflective rod is easily spotted by a vehicle coming from the side when the supporting bracket is erected. Accordingly, a side collision is positively avoided.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of an improved footrest. In the drawings:

FIG. 1A is an enlarged perspective view of the conventional footrest shown in FIG. 1;

DETAILED DESCRIPTION OF PREFERABLE EMBODIMENT

Figure 1:
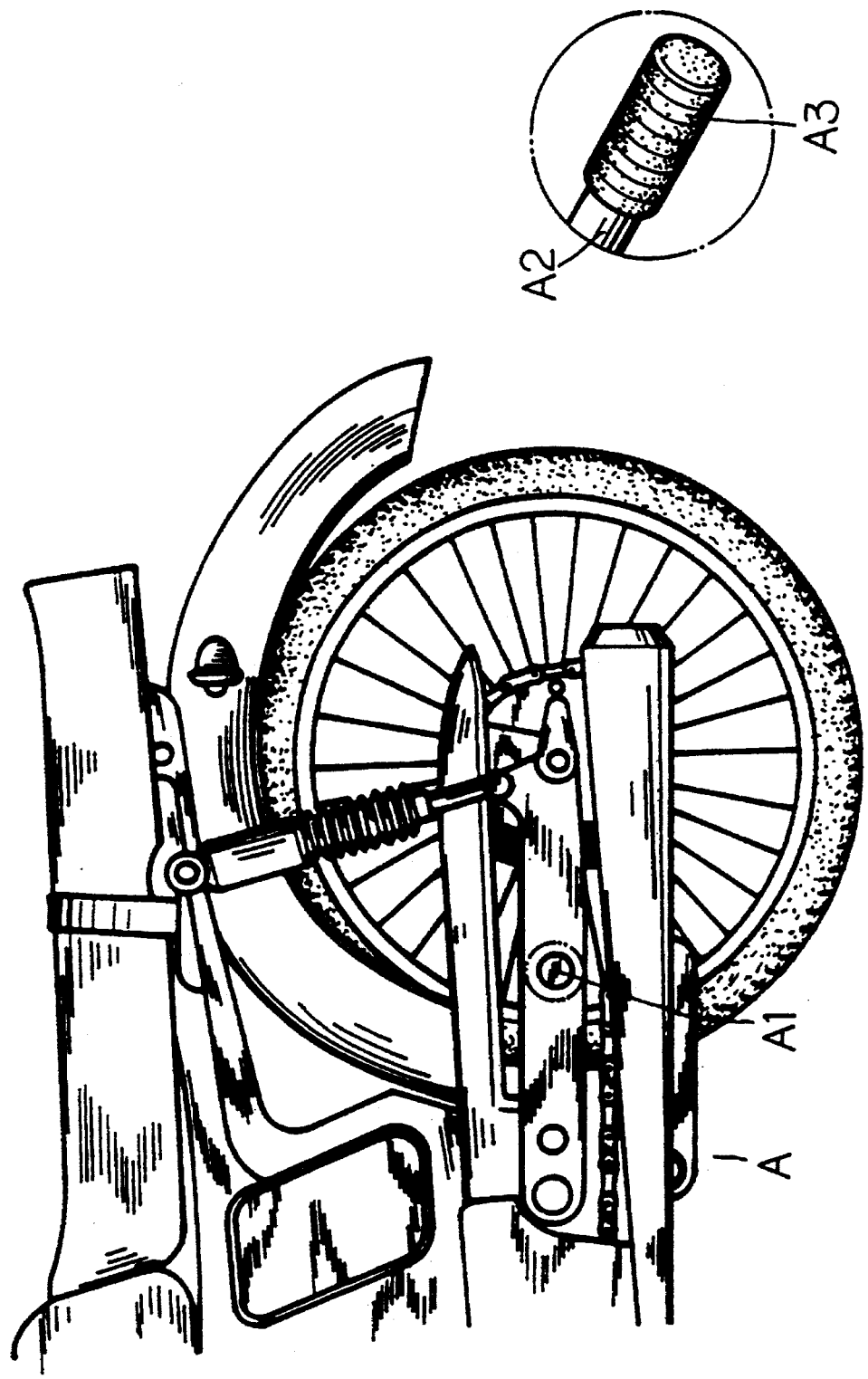
FIG. 1 is a side view of a portion of a motorcycle having a conventional footrest.
Figure 2:
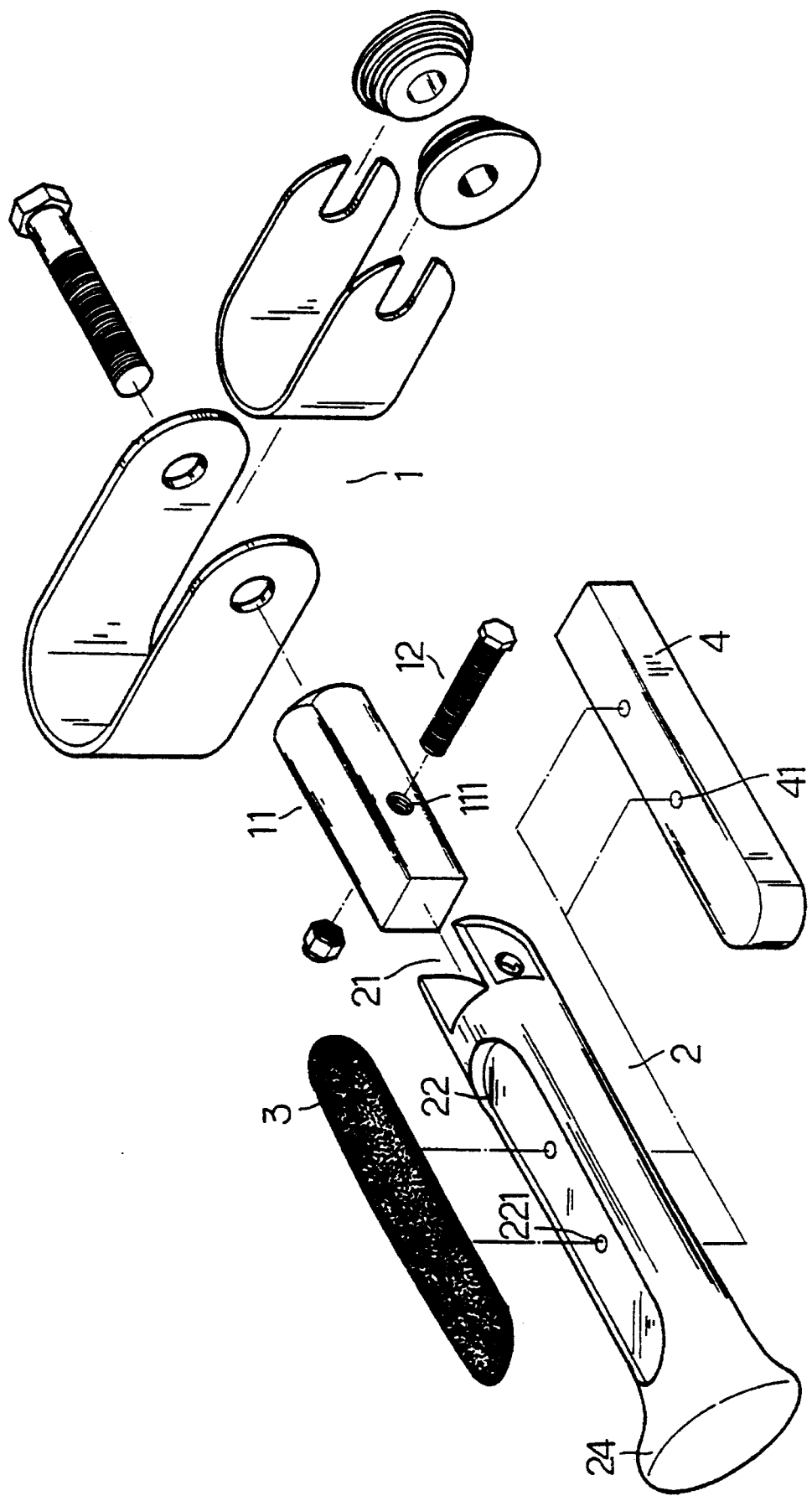
FIG. 2 is an exploded perspective view of the footrest made according to this invention.
Figure 3:
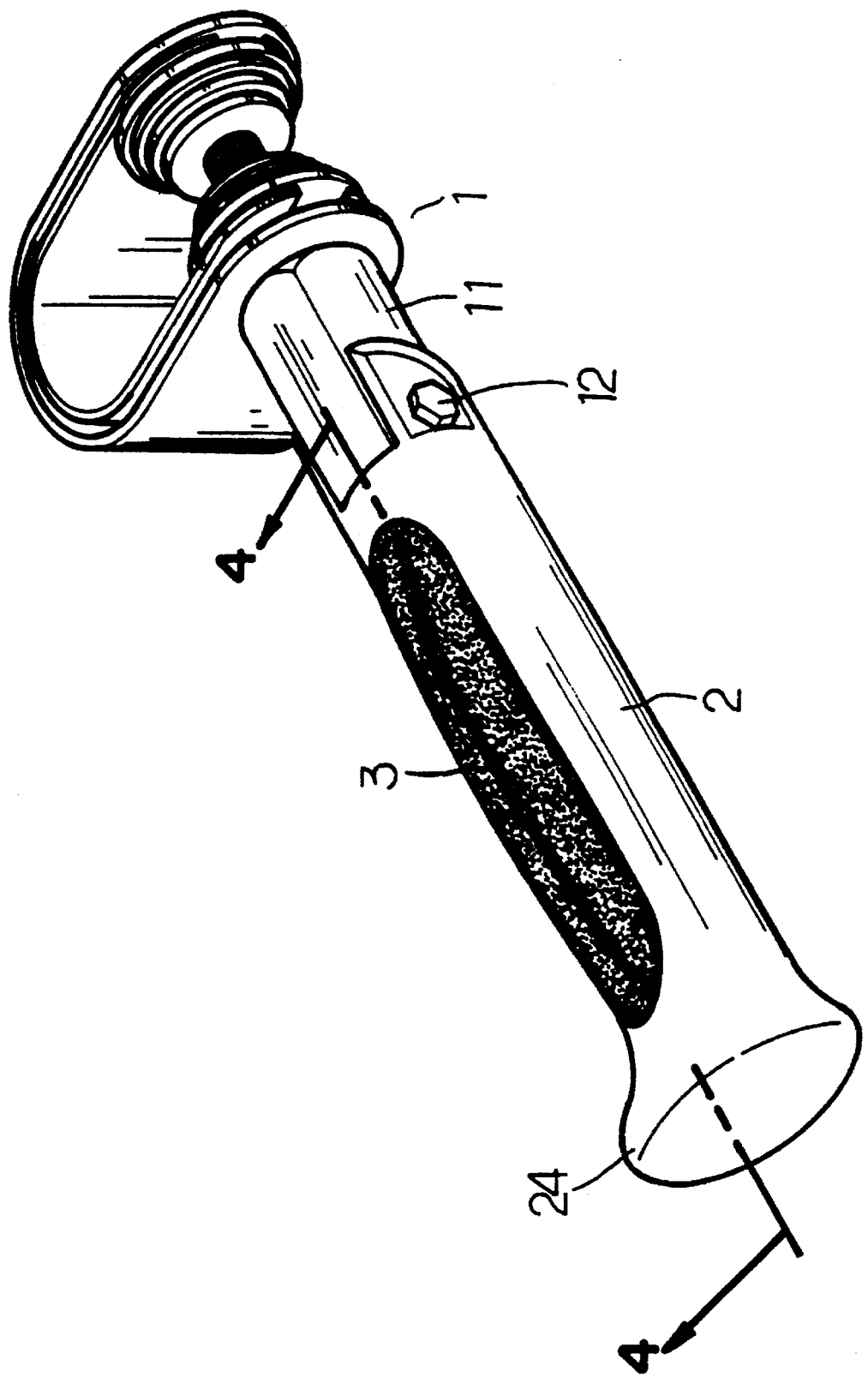
FIG. 3 is a perspective view of the footrest made according to this invention.
Figure 4:
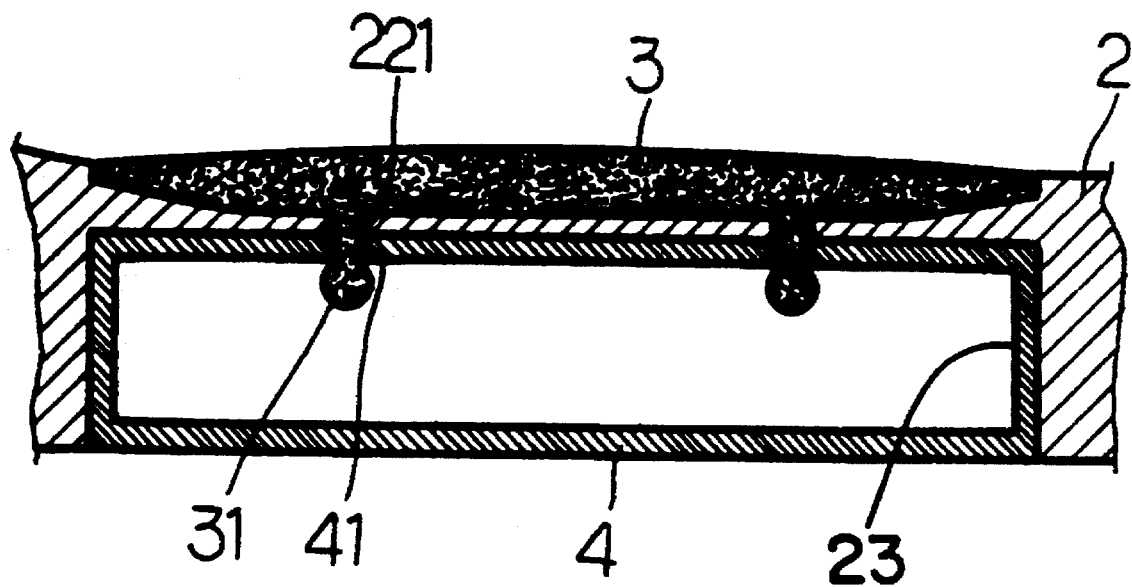
FIG. 4 is cross sectional view of the footrest taken from line 4—4 of FIG. 3.

Referring to FIGS. 2, 3 and 4, the footrest made according to this invention includes a supporting bracket assembly 1 attached to the frame A of the motorcycle. The supporting bracket assembly 1 includes a supporting rod 11 which has a rectangular cross section and can be attached to the frame A. The supporting rod 11 is provided with a traverse hole 111 formed through the middle portion of the rod. A supporting bracket 2 is provided at one end with a lug 21 which has a hole formed therethrough. The supporting rod 11 can be pivotedly received in the lug of the supporting bracket through the use of a bolt 12 which passes through the holes in the lug and the supporting rod.

The supporting bracket 2 further includes an elongate slot 22 at the upper surface of the bracket and a receiving chamber 23 at the underside portion of the bracket. A plurality of holes 221 are formed in the bracket 2 between the slot and the chamber such that the slot 22 is in communication with the receiving chamber 23 through said plurality of holes 221. The supporting bracket 2 is further provided with an enlarged end portion 24 defining a protective end thereof. Accordingly, the side movement of the foot is avoided by this arrangement.

An elongate pad 3 which has an identical configuration with said elongate slot 22 is received and retained within said slot 22. This elongate pad 3 is made from resilient material and the underside of the pad 3 is provided with a plurality of dowel post 31 which project through said holes 221 of said supporting 2.

An elongate reflective rod 4 which has the identical configuration of said receiving chamber 23 is received within said chamber 23. The reflective rod 4 is made from, preferably, a reflective (fluorescent) material and is provided with a plurality of positioning hole 41 in alignment with said holes 221 of said bracket 2. When the rod 4 is received into said receiving chamber 23 and said pad 3 is retained within said slot 22, the dowel post 31 of said pad 3 are engaged with the reflective rod 4 through the engagement between said dowel post 31 and said positioning holes 41. By this arrangement, the reflective rod 4 and the pad 3 are firmly retained onto the supporting bracket 2, as clearly shown in FIG. 4.

Figure 5:
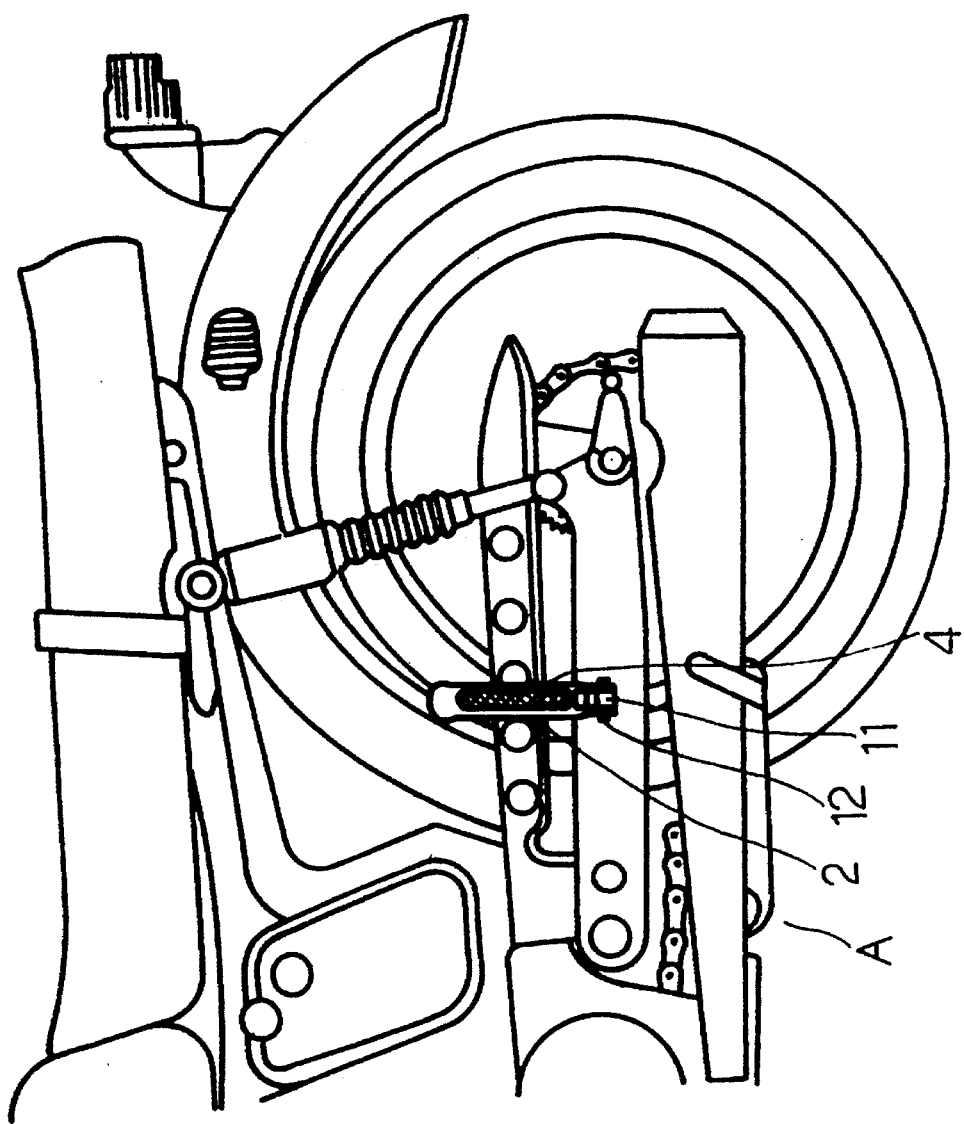
FIG. 5 is a side view of a portion of a motorcycle showing the footrest made according to this invention in a rest position.

Referring to FIG. 5, the enlarged portion 24 can effectively limit the side movement of the foot resulting from vibration during riding. If the pad 3 has a certain thickness, accordingly, the vibration absorbing capability can be further enhanced. As a result, the foot can be preferably supported during the riding.

When the supporting bracket 2 is erected to a vertical position, the reflective rod 4 faces toward the outside, as clearly shown in FIG. 5. By this arrangement, the motorcycle can be easily spotted by the driver of a vehicle approaching from the side, such as when the motorcycle is stopped for traffic lights. Accordingly, the accident resulted from collision is prevented.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claim.

We claim:

1. A footrest for a motorcycle including a supporting bracket assembly attached to the frame of the motorcycle, a supporting bracket pivotally mounted at one end to said supporting bracket assembly and including an elongate slot formed in an upper surface of said supporting bracket and a receiving chamber formed in a bottom side of said bracket which is in communication with the slot through a plurality of holes formed in said supporting bracket between said elongate slot and said chamber, the supporting bracket being further provided at another end with an enlarged end portion defining a protective end thereof, an elongate pad which is made from resilient material disposed within said slot, said pad being provided with a plurality of dowel posts projecting from an underside of said pad and extending through the holes between said slot and said chamber and further extending into said chamber, an elongate reflective rod which includes a plurality of positioning holes in alignment with said dowel posts, said reflective rod disposed within the chamber, ends of said dowel posts projecting into and engaging with said positioning holes of said reflective rod such that the pad is retained within said elongate slot and the reflective rod is retained within said chamber.

\* \* \* \* \*